(12) United States Patent
Fujimoto et al.

(10) Patent No.: US 7,575,084 B2
(45) Date of Patent: Aug. 18, 2009

(54) AUTOMOBILE AND CONTROL APPARATUS, AND POWER TRAIN SYSTEM OF AUTOMOBILE

(75) Inventors: Kinya Fujimoto, Hitachinaka (JP); Tetsuo Matsumura, Hitachinaka (JP); Hiroshi Kuroiwa, Hitachi (JP); Naoyuki Ozaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 505 days.

(21) Appl. No.: 10/996,060

(22) Filed: Nov. 24, 2004

(65) Prior Publication Data
US 2005/0137058 A1 Jun. 23, 2005

(30) Foreign Application Priority Data
Nov. 27, 2003 (JP) .............................. 2003-396471

(51) Int. Cl.
*B60K 17/354* (2006.01)
(52) U.S. Cl. ....................................... 180/245; 701/51
(58) Field of Classification Search ................. 180/245; 477/84, 166; 701/51
See application file for complete search history.

(56) References Cited

U.S. PATENT DOCUMENTS

| 4,848,508 A | * | 7/1989 | Smirl et al. | 180/248 |
| 7,080,707 B2 | * | 7/2006 | Kirkwood | 180/245 |

FOREIGN PATENT DOCUMENTS

JP 2-305333 12/1990

* cited by examiner

*Primary Examiner*—Christopher P Ellis
*Assistant Examiner*—Marc A Scharich
(74) *Attorney, Agent, or Firm*—Crowell & Moring LLP

(57) ABSTRACT

An automobile is equipped with a gear type transmission having a first torque transfer path between input and output shafts formed by mesh type clutches and a second torque transfer path between input and output shafts formed by transfer torque variable systems, and actuators for selecting the torque transfer path. When a wheel slips while the automobile is driving using the first torque transfer path, the actuators are controlled so that at least part of the torque being transferred via the first torque transfer path is instead transferred via the second torque transfer path.

9 Claims, 12 Drawing Sheets

AUTOMOBILE AND CONTROL APPARATUS, AND POWER TRAIN SYSTEM OF AUTOMOBILE

BACKGROUND OF THE INVENTION

The present invention relates to an automobile, a control apparatus and a power train system for an automobile, particularly to a traction control for avoiding slip of wheels that use automatic transmission.

Traction control to be performed when slip is caused on wheels at the time of start or acceleration of an automobile is generally constructed to decrease drive torque and avoid wheel slip accordingly by continuously adjusting the torque generated by the engine.

For example, it is known to control the throttle (throttle valve) opening by feeding back the slip ratio determined from the speed difference between a driven wheel and a drive wheel so that the slip ratio equals to a target slip ratio (see Japanese Patent Laid-Open Publication No. HEI 2-305333 (1990), for example).

SUMMARY OF THE INVENTION

The above art enables a decrease in the drive torque and avoids wheel slip, but has a response that is not high, because the engine generated torque is varied by adjusting the suction air volume and ignition timing. In addition, since the operating point of the engine varies, the exhaust becomes worse.

In order to solve this problem, the present invention is equipped with a gear type transmission comprising a torque transfer path between the input and output shafts formed by mesh type clutches and another torque transfer path between the input and output shafts formed by transfer torque variable systems, and performs traction control using the transfer torque variable systems.

Wheel slip can be avoided with high response, and exhaust deterioration can be minimized irrespective of the engine performance.

DESCRIPTION OF THE PREFERRED EMBODIMENT

Figure 1:
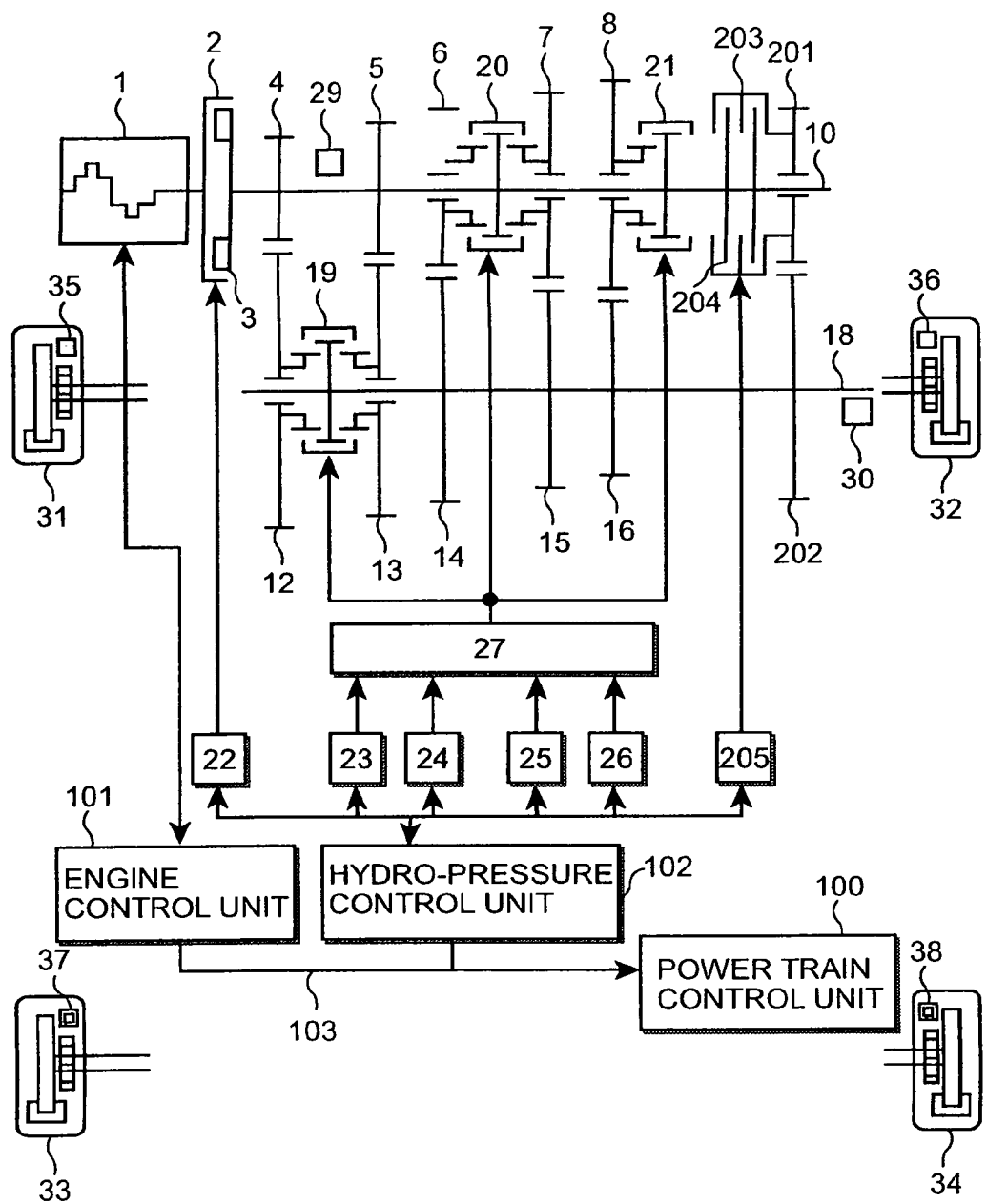
FIG. 1 is an overall block diagram showing the construction of a first automobile system according to an embodiment of the present invention.

FIG. 1 is an overall block diagram showing the construction of the first automobile system according to an embodiment of the present invention.

An engine 1, as a drive power source, is equipped with an engine speed sensor (not shown) for measuring the speed of the engine 1, an electronic throttle (not shown) for adjusting the engine torque, and a fuel injection device (not shown) for injecting necessary fuel quantity corresponding to the suction air volume. The engine 1 torque can be precisely controlled by the engine control unit 101 that adjusts the suction air volume, fuel quantity and ignition timing. While the fuel injection device is either a suction port injection type for injecting fuel through a suction port or a direct injection type for injecting fuel directly into the cylinder, it is advantageous to compare the operating area (area defined by the engine torque and engine speed) required of the engine and to employ an engine type which reduces fuel consumption and improves exhaust performance. The drive power source is not necessarily be a gasoline engine, but may be a diesel engine, natural gas engine or electric motor.

An input shaft clutch input disc 2 is connected with the engine 1, and the engine 1 torque can be transferred to a transmission input shaft 10 and shut off by engaging and disengaging the input shaft clutch input disc 2 with the input shaft clutch output disc 3. A dry single-plate type input shaft clutch is used here, but any other friction mechanism, such as a wet multi-plate clutch or an electromagnetic clutch, is also usable.

A hydraulically driven actuator 22 is used to control the pressing force (input shaft clutch torque) between the input shaft clutch input disc 2 and input shaft clutch output disc 3, and the engine 1 output can be transferred to the input shaft 10 and shut off by adjusting the pressing force (input shaft clutch torque).

The input shaft 10 is equipped with the 1st drive gear 4, the 2nd drive gear 5, the 3rd drive gear 6, the 4th drive gear 7, the 5th drive gear 8, the reverse drive gear (not shown), and the 7th drive gear 201. While the 1st drive gear 4 and the 2nd drive gear 5 are fastened on the transmission input shaft 10, the 3rd drive gear 6, the 4th drive gear 7, the 5th drive gear 8, the reverse drive gear, and the 7th drive gear 201 are installed to rotate freely on the transmission input shaft 10. As a means for sensing the input shaft speed, a sensor 29 is provided for sensing the speed of the transmission input shaft 10.

A transmission output shaft 18 is equipped with the 1st driven gear 12, the 2nd driven gear 13, the 3rd driven gear 14, the 4th driven gear 15, the 5th driven gear 16, the reverse driven gear (not shown), and the 7th driven gear 202. While the 1st driven gear 12 and the 2nd driven gear 13 are installed to rotate freely on the transmission output shaft 18, the 3rd driven gear 14, the 4th driven gear 15, the 5th driven gear 16, the reverse driven gear, and the 7th driven gear 202 are fastened on the transmission output shaft 18. As a means for sensing the output shaft speed, a sensor 30 is provided for sensing the speed of the transmission output shaft 18.

The 1st driven gear 12 is engaged with the 1st drive gear 4, the 2nd driven gear 13 is engaged with the 2nd drive gear 5, the 3rd driven gear 14 is engaged with the 3rd drive gear 6, the 4th driven gear 15 is engaged with the 4th drive gear 7, the 5th driven gear 16 is engaged with the 5th drive gear 8, the reverse driven gear is engaged with the reverse drive gear via a reversing gear (not shown), and the 7th driven gear 202 is engaged with the 7th drive gear 201.

Between the 1st driven gear 12 and the 2nd driven gear 13, there is provided the 1st mesh type clutch 19 that engages the 1st driven gear 12 with the transmission output shaft 18 and also engages the 2nd driven gear 13 with the transmission output shaft 18. Accordingly, the rotating torque transferred from the 1st drive gear 4 or 2nd drive gear 5 to the 1st driven gear 12 or 2nd driven gear 13 is transferred to the 1st mesh type clutch 19 and then to the transmission output shaft 18 via the 1st mesh type clutch 19.

In addition, between the 3rd drive gear 6 and the 4th drive gear 7, there is provided the 2nd mesh type clutch 20, which is a mesh type mechanism for engaging the 3rd drive gear 6 with the transmission output shaft 10 and also engaging the 4th drive gear 7 with the transmission input shaft 10. Accordingly, the rotating torque transferred to the 3rd drive gear 6 or the 4th drive gear 7 is transferred to the 3rd driven gear 14 or the 4th driven gear 15 via the 2nd mesh type clutch 20 and then to the transmission output shaft 18.

In addition, between the 5th drive gear 8 and the reverse drive gear, there is provided the 3rd mesh type clutch 21, which is a mesh type mechanism for engaging the 5th drive gear 8 with the transmission output shaft 10 and also engaging the reverse drive gear with the transmission input shaft 10. Accordingly, the rotating torque transferred to the 5th drive gear 8 or the reverse drive gear is transferred to the 5th driven gear 16 or the reverse driven gear via the 3rd mesh type clutch 21 and then to the transmission output shaft 18.

In this construction, it is preferable that a synchronizer mechanism for smoothing the speed with the aid of friction force is added to the mesh type clutch.

In order to transfer the rotating torque of the transmission input shaft 10 to the transmission output shaft 18, any one of the 1st mesh type clutch 19, the 2nd mesh type clutch 20, or the 3rd mesh type clutch 21 is moved in the axial direction of the transmission input shaft 10 or the axial direction of the transmission output shaft 18. For this purpose, a shift/select mechanism 27 is operated using a shift 1st actuator 23, a shift 2nd actuator 24, a select 1st actuator 25, and a select 2nd actuator 26. Then, one of the 1st mesh type clutch 19, the 2nd mesh type clutch 20, or the 3rd mesh type clutch 21 is engaged with any one of the 1st driven gear 12, the 2nd driven gear 13, the 3rd drive gear 6, the 4th drive gear 7, the 5th drive gear 8, or the reverse drive gear so as to transfer the rotating torque of the transmission input shaft 10 to the drive wheel output shaft 18 via the 1st mesh type clutch 19, the 2nd mesh type clutch 20, or the 3rd mesh type clutch 21.

As explained above, the torque transfer path between the input and output shafts is formed by mesh type clutches.

In this embodiment, hydraulic actuators are used for the shift 1st actuator 23, the shift 2nd actuator 24, the select 1st actuator 25, and the select 2nd actuator 26, but an electromagnetic valve can be used, and an electric actuator using an electric motor, etc., can also be used. It is also permissible to employ one actuator instead of the shift 1st actuator 23 and the shift 2nd actuator 24, and to employ one actuator instead of the select 1st actuator 25 and the select 2nd actuator 26. In addition, the shift/select mechanism 27 can be constructed by a shifting rail or shifting fork, or can also be a drum type. The shift/select mechanism 27 is equipped with a position-retaining device (not shown) for holding the gear position so as to prevent the gears from falling off when driving. The relationship between the operation of the shift 1st actuator 23, the shift 2nd actuator 24, the select 1st actuator 25 and the select 2nd actuator 26 and the operation of the 1st mesh type clutch 19, the 2nd mesh type clutch 20 and the 3rd mesh type clutch 21 will be described later, using FIG. 3.

The input shaft 10 is equipped with assist clutches 203 and 204 as a type of transfer torque variable system. With the aid of these elements, the 7th drive gear 201 is connected with the assist clutch input disc 203, the transmission input shaft 10 is connected with the assist clutch output disc 204, and the assist clutch input disc 203 is engaged with the assist clutch output disc 204, and, hence, the torque of the 7th driven gear 202 can be transferred to the transmission output shaft 18. Although the gear ratio between the 7th drive gear and the 7th driven gear is set, for example, in the middle of the gear ratio of the 3rd gear, comprising the 3rd drive gear 6 and the 3rd driven gear 14, and the gear ratio of the 4th gear, comprising the 4th drive gear 7 and the 4th driven gear 15, in this embodiment, it is not limited to this gear ratio, but can be set to any other gear ratio.

A hydraulically driven actuator 205 is used to control the pressing force (assist clutch torque) between the assist clutch input disc 203 and the assist clutch output disc 204, and the engine 1 output can be transferred by adjusting the pressing force (assist clutch torque).

The assist clutch as a transfer torque variable system can be configured by a friction mechanism or a motor-driven generator. The friction mechanism, which is used for generating friction force by pressing onto a friction surface so as to transfer the torque, includes a typical friction clutch. Friction clutches are available in various types, such as a dry single-plate clutch, a dry multi-plate clutch, a wet multi-plate clutch, and an electromagnetic clutch. In this embodiment, a wet multi-plate clutch, as a friction mechanism, is employed for the assist clutches 203 and 204, but any other type of transfer torque variable system is applicable.

The torque transfer path between the input and output shafts is also formed using the transfer torque variable systems. Traction control, to be described later, is performed by controlling the transfer torque variable systems.

The rotating torque of the transmission input shaft 10 transferred to the transmission output shaft 18 from the 1st drive gear 4, the 2nd drive gear 5, the 3rd drive gear 6, the 4th drive gear 7, the 5th drive gear 8, the reverse drive gear, and the 7th drive gear 201 via the 1st driven gear 12, the 2nd driven gear 13, the 3rd driven gear 14, the 4th driven gear 15, the 5th driven gear 16, the reverse driven gear, and the 7th driven gear 202 is then transferred to the wheel shaft (not shown) via a differential gear (not shown) connected with the transmission output shaft 18 and drives the drive wheels 31 and 32. It is preferable that drive wheel speed sensors 35 and 36 and driven wheel speed sensors 37 and 38 are installed on the drive wheels 31 and 32 and driven wheels 33 and 34, respectively, so as to be able to sense the rotating speed of each wheel.

The input shaft clutch actuator 22 for generating the pressing force (input shaft clutch torque) between the input shaft clutch input disc 2 and the input shaft clutch output disc 3 and the assist clutch actuator 205 for generating the pressing force (assist clutch torque) between the assist clutch input disc 203 and the assist clutch output disc 204 are controlled by the hydraulic control unit 102. For example, the hydraulic pressure of each actuator is controlled by adjusting the stroke of a hydraulic cylinder (not shown) installed on each actuator by controlling the current of an electromagnetic valve (not shown) installed on each actuator so as to control the transfer torque of each clutch.

In addition, the hydraulic control unit 102 controls the hydraulic pressure of each actuator by adjusting the stroke of a hydraulic cylinder (not shown) installed on each actuator by controlling the current of an electromagnetic valve (not shown) installed on each select 1st actuator 25 and select 2nd actuator 26 and selects which of the 1st mesh type clutch 19, the 2nd mesh type clutch 20, or the 3rd mesh type clutch 21 is to be moved.

In addition, the hydraulic control unit 102 controls the hydraulic pressure of each actuator by adjusting the stroke of a hydraulic cylinder (not shown) installed on each actuator by controlling the current of an electromagnetic valve (not shown) installed on each actuator of the shift 1st actuator 23 and the shift 2nd actuator 24, by which a load for operating the 1st mesh type clutch 19, the 2nd mesh type clutch 20 and the 3rd mesh type clutch 21 can be controlled.

In this embodiment, a hydraulic actuator is employed for the input axis clutch actuator 22 and the assist clutch actuator 205, but an electric actuator using a motor, etc, can also be employed.

The engine 1 torque can be precisely controlled by the engine control unit 101 that adjusts the suction air volume, fuel quantity and ignition timing.

The hydraulic control unit 102 and the engine control unit 101 are controlled by a power train control unit 100. The power train control unit 100, the engine control unit 101 and the hydraulic control unit 102 send and receive information to/from each other via a communication means 103.

Although a hydraulic control unit 102 for controlling the hydraulic actuators is employed because hydraulic actuators are used in this embodiment, a motor control unit is employed instead of the hydraulic control unit 102 if electric actuators using a motor, etc. are used.

Figure 2:
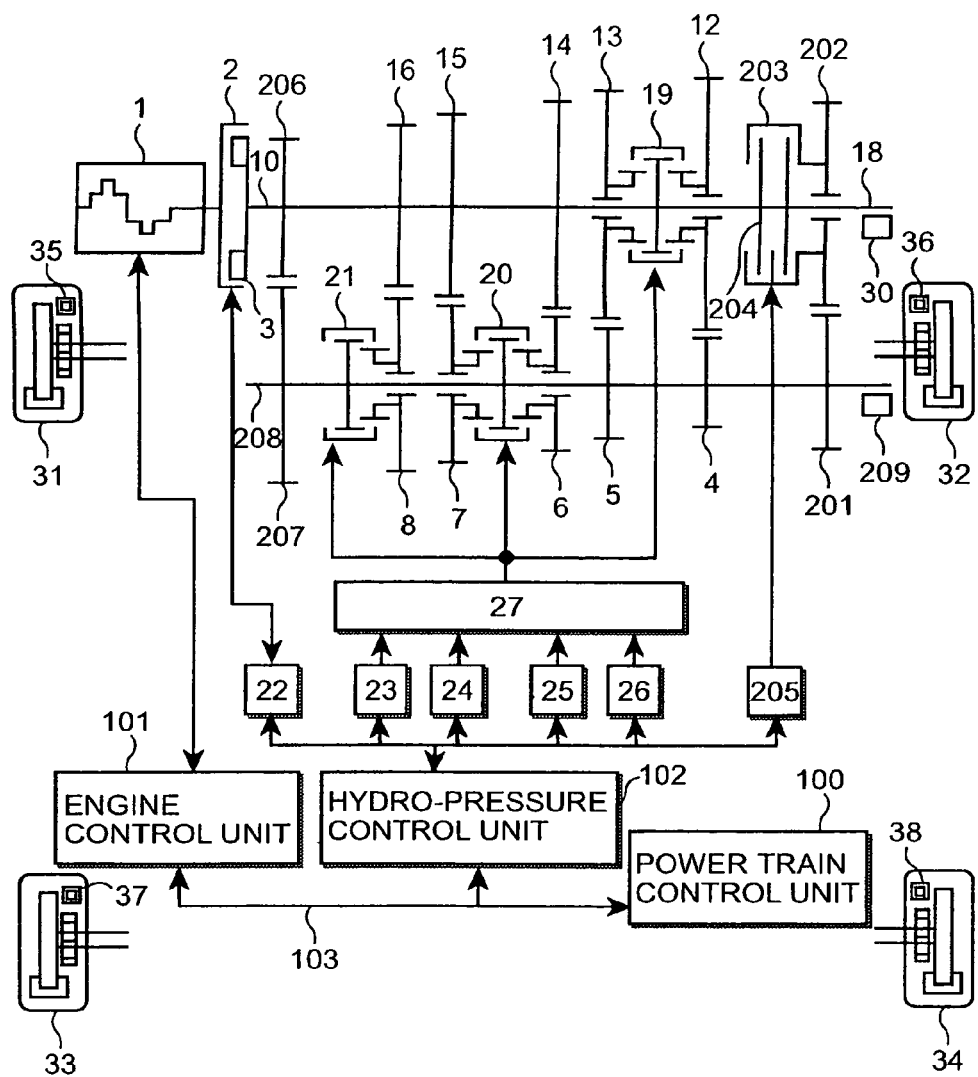
FIG. 2 is an overall block diagram showing the construction of a second automobile system according to an embodiment of the present invention

FIG. 2 is an overall block diagram showing the construction of the second automobile system according to an embodiment of the present invention. The same symbols as in FIG. 1 represent the same elements.

This embodiment differs from the one in FIG. 1 in that, while the embodiment in FIG. 1 is constructed with two shafts, namely transmission input shaft 10 and transmission output shaft 18, this embodiment is constructed with three shafts including a counter shaft 208. Accordingly, the power of the engine 1 is transferred from the input drive gear 206 to the input driven gear 207 and then to the transmission output shaft 18 from the counter shaft 208 via the 1st drive gear 4, the 2nd drive gear 5, the 3rd drive gear 6, the 4th drive gear 7, the 5th drive gear 8, the reverse drive gear (not shown), and the 7th drive gear 201, and the 1st driven gear 12, the 2nd driven gear 13, the 3rd driven gear 14, the 4th driven gear 15, the 5th driven gear 16, the reverse driven gear (not shown), and the 7th driven gear 202.

Although the gear ratio between the 7th drive gear and the 7th driven gear, with which the assist clutch, as a type of transfer torque variable system, is set in the middle of the gear ratio of the 3rd gear, comprising the 3rd drive gear 6 and the 3rd driven gear 14, and the gear ratio of the 4th gear, comprising the 4th drive gear 7 and the 4th driven gear 15 in the embodiments shown in FIG. 1 and FIG. 2, the gear ratio of the transfer torque variable system may be set in the middle of the gear ratios of the 3rd gear and the 4th gear, equivalent to the 3rd gear ratio or to the 4th gear ratio, or equivalent to the highest gear ratio. In addition, a transfer torque variable system can be used instead of a mesh type mechanism installed at a specified gear position. Furthermore, multiple transfer torque variable systems can be installed at different gear positions.

The present invention can be applied to various types of transmission including a gear type transmission equipped with multiple gear trains and multiple torque transfer mechanisms between the input and output shafts of the transmission and employing the transfer torque variable system for at least one of the torque transfer mechanisms.

Figure 3:
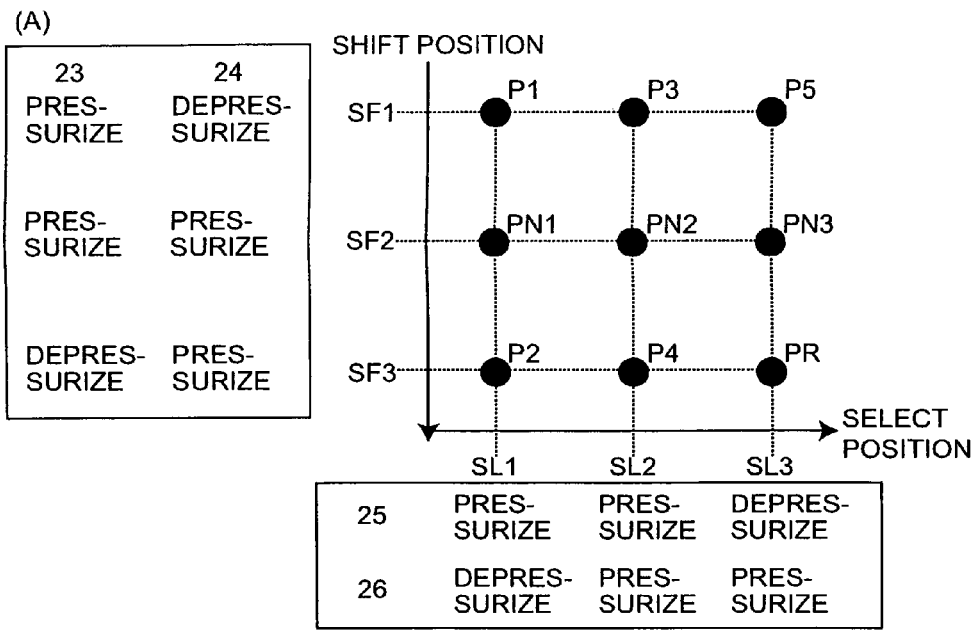
FIG. 3 is a diagram showing the relationship between the gear engagement, the shift position, and the select position in FIG. 1 or FIG. 2.

FIG. 3 shows the relationship of the engagement of the 1st mesh type clutch 19, the 2nd mesh type clutch 20 and the 3rd mesh type clutch 21 with the 1st driven gear 12, the 2nd driven gear 13, the 3rd driven gear 14, the 4th driven gear 15, the 5th driven gear 16, and the reverse driven gear when the shift/select mechanism 27 is controlled, that is, when the shift position and the select position are controlled by the shift 1st actuator 23, the shift 2nd actuator 24, the select 1st actuator 25 and the select 2nd actuator 26.

When the 1st mesh type clutch 19 is selected to move from a select position SL1 by pressurizing the select 1st actuator 25 and depressurizing the select 2nd actuator 26, the shift load is controlled by moving the shift position to a shift position SF1 by pressurizing the shift 1st actuator 23 and depressurizing the shift 2nd actuator 24, the shift position and select position are moved to point P1, where the 1st mesh type clutch 19 is engaged with the 1st driven gear 12, and thus the 1st gear is set.

When the 1st mesh type clutch 19 is selected to move from a select position SL1 by pressurizing the select 1st actuator 25 and depressurizing the select 2nd actuator 26, the shift load is controlled by moving the shift position to a shift position SF3 by depressurizing the shift 1st actuator 23 and pressurizing the shift 2nd actuator 24, the shift position and select position are moved to point P2, where the 1st mesh type clutch 19 is engaged with the 2nd driven gear 13, and thus the 2nd gear is set.

When the 2nd mesh type clutch 20 is selected to move from a select position SL2 by pressurizing both the select 1st actuator 25 and the select 2nd actuator 26, the shift load is controlled by moving the shift position to move to a shift position SF1 by pressurizing the shift 1st actuator 23 and depressurizing the shift 2nd actuator 24, the shift position and select position are moved to point P3, where the 2nd mesh type clutch 20 is engaged with the 3rd drive gear 6, and thus the 3rd gear is set.

When the 2nd mesh type clutch 20 is selected to move from a select position SL2 by pressurizing both the select 1st actuator 25 and the select 2nd actuator 26, the shift load is controlled by moving the shift position to a shift position SF3 by depressurizing the shift 1st actuator 23 and pressurizing the shift 2nd actuator 24, the shift position and select position are moved to point P4, where the 2nd mesh type clutch 20 is engaged with the 4th drive gear 7, and thus the 4th gear is set.

When the 3rd mesh type clutch 21 is selected to move from a select position SL3 by depressurizing the select 1st actuator 25 and pressurizing the select 2nd actuator 26 the shift load is controlled by moving the shift position to a shift position SF1 by pressurizing the shift 1st actuator 23 and depressurizing the shift 2nd actuator 24, the shift position and select position are moved to point P5, where the 3rd mesh type clutch 21 is engaged with the 5th drive gear 8, and thus the 5th gear is set.

When the 3rd mesh type clutch 21 is selected to move from a select position SL3 by depressurizing the select 1st actuator 25 and pressurizing the select 2nd actuator 26, the shift load is controlled by moving the shift position to a shift position SF3 by depressurizing the shift 1st actuator 23 and pressurizing the shift 2nd actuator 24, the shift position and select position are moved to point PR, where the 3rd mesh type clutch 21 is engaged with the reverse drive gear (not shown), and thus the reverse gear is set.

When the shift load is controlled, and the shift position is controlled to move to a shift position of SF2, by pressurizing both shift 1st actuator 23 and the shift 2nd actuator 24, the gears are disengaged, and thus the neutral gear is set.

Figure 4:
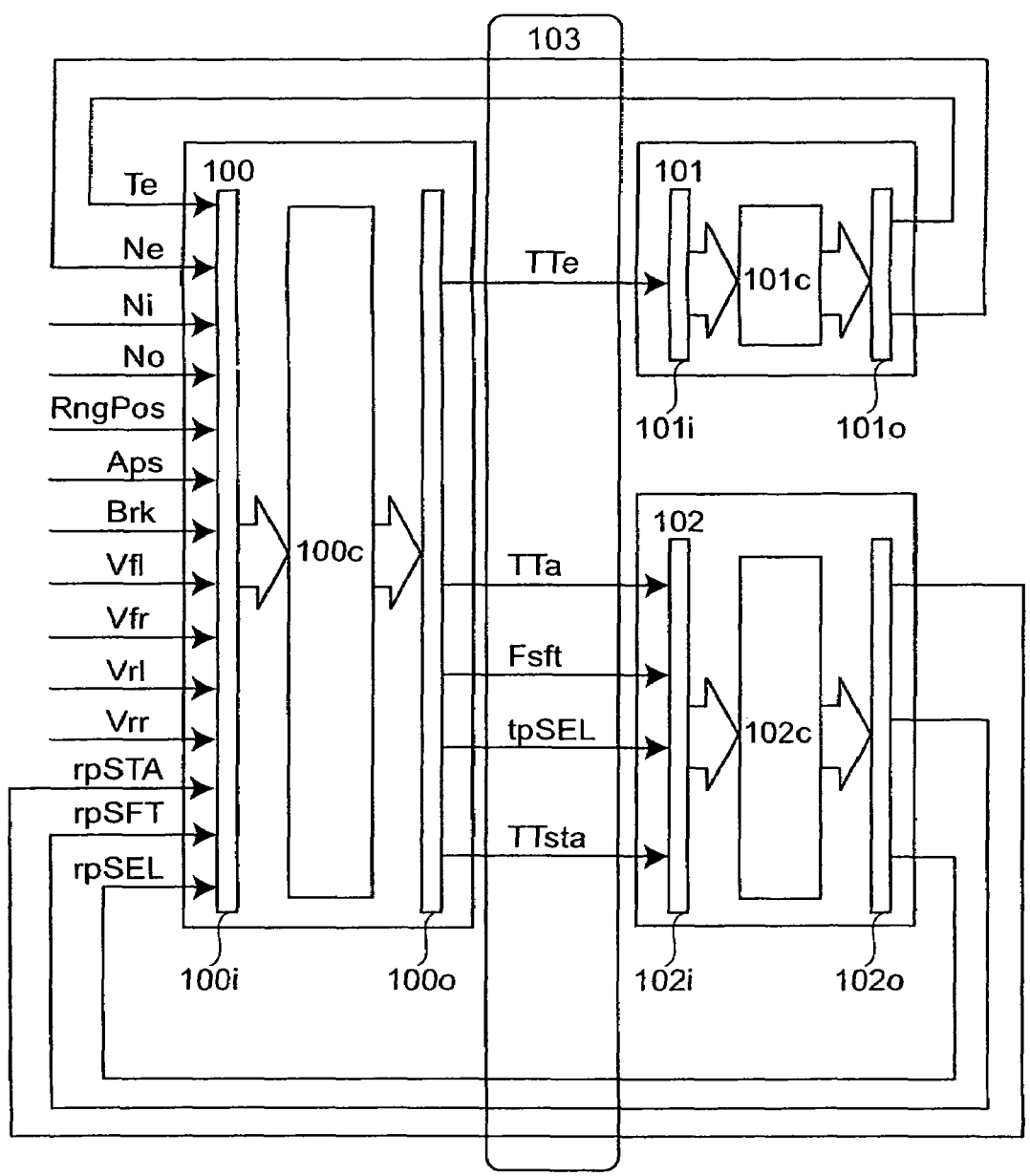
FIG. 4 is a diagram showing the input/output signals among the power train control unit, engine control unit and hydraulic control unit in FIG. 1 or FIG. 2.

FIG. 4 shows input/output signals for the power train control unit 100, the engine control unit 101 and the hydraulic control unit 102 through the communication means 103. The power train control unit 100 is constructed as a control unit comprising an input section 100$i$, an output section 100$o$ and a computer 100$c$. Similarly, the engine control unit 101 is constructed as a control unit comprising an input section 101$i$, an output section 101$o$ and a computer 101$c$, and the hydraulic control unit 102 is constructed as a control unit comprising an input section 102$i$, an output section 102$o$ and a computer 102$c$.

Engine torque reference TTe is sent from the power train control unit 100 to the engine control unit 101 by the communication means 103, and the engine control unit 101 controls the suction air volume, fuel quantity and ignition timing (not shown) of the engine 1 so as to realize TTe. The engine control unit 101 is equipped inside with a sensing means (not shown) that senses the engine torque, which is an input torque to the transmission. The speed Ne of the engine 1 and the engine torque Te generated by the engine 1 are sensed by the engine control unit 101 and sent to the power train control unit 100 by the communication means 103. For the engine torque sensing means, either a torque sensor is used, or an estimation is made using the injection pulse width of the injector or pressure inside the suction pipe and engine parameters such as engine speed.

The input shaft clutch target torque TTsta, the target shift load Fsft, the target select position tpSEL, and the assist clutch target torque TTa are sent from the power train control unit 100 to the hydraulic control unit 102, and the hydraulic control unit engages or disengages the input shaft clutch input disc 2 and the input shaft clutch output disc 3 by controlling the input shaft clutch actuator 22 so as to realize the input shaft clutch target torque TTsta. In addition, the hydraulic control unit engages or disengages the 1st mesh type clutch 19, the 2nd mesh type clutch 20, and the 3rd mesh type clutch 21 by controlling the shift position and the select position by controlling the shift 1st actuator 23, the shift 2nd actuator 24, the select 1st actuator 25, and the select 2nd actuator 26, and by operating the shift/select mechanism 27 so as to realize the target shift load Fsft and target select position tpSEL. It also engages or disengages the assist clutch input disc 203 and the assist clutch output disc 204 by controlling the assist clutch actuator 205 so as to realize the assist clutch target torque TTa.

Position signal rpSTA, shift position signal rpSFT and select position signal rpSEL indicating the engaged or disengaged state of the input shaft clutches are sensed by the hydraulic control unit 102 and sent to the power train control unit 100.

Input shaft speed Ni and output shaft speed No are inputted to the power train control unit 100 from the input shaft speed sensor 29 and the output shaft speed sensor 30, respectively; and also left drive wheel speed Vfl is inputted from a drive wheel speed sensor 35, a right drive wheel speed Vfr is inputted from a drive wheel speed sensor 36, a left driven wheel speed Vrl is inputted from a driven wheel speed sensor 37, and a right driven wheel speed Vrr is inputted from a driven wheel speed sensor 38, respectively.

In addition, a range position signal RngPos indicating the shift lever position such as P range, R range, N range and D range, an accelerator pedal position Aps, and an ON/OFF signal Brk from a brake switch detecting whether the brake is operated or not are inputted.

When, for example, the driver changes the shift range to D range and presses down the accelerator pedal, the power train control unit 100 judges that the driver is requesting start and acceleration. When the driver presses down the brake pedal, the power train control unit judges that the driver is willing to decelerate and stop, and sets the engine torque reference TTe, input shaft clutch target torque TTsta, target shift load Fsft, and target select position tpSEL so as to realize the driver's intention. The unit also sets the gear position based on the vehicle speed Vsp calculated from the output shaft speed No and the accelerator pedal position Aps, and sets the engine torque reference TTe, input shaft clutch target torque TTsta, target shift load Fsft, target select position tpSEL, and assist clutch target torque TTa so as to perform shifting to the set gear position. When the target shift load Fsft>0, the hydraulic control unit 102 controls the shift 1st actuator 23 and the shift 2nd actuator 24 so that the shift position in FIG. 3 moves toward SF1. When the target shift load Fsft<0, the hydraulic control unit 102 controls the shift 1st actuator 23 and the shift 2nd actuator 24 so that the shift position in FIG. 3 moves toward SF3.

Next, traction control in case of slip under acceleration performed by the control apparatus of an automobile according to this embodiment will be described by referring to FIG. 5 to FIG. 11.

Figure 5:
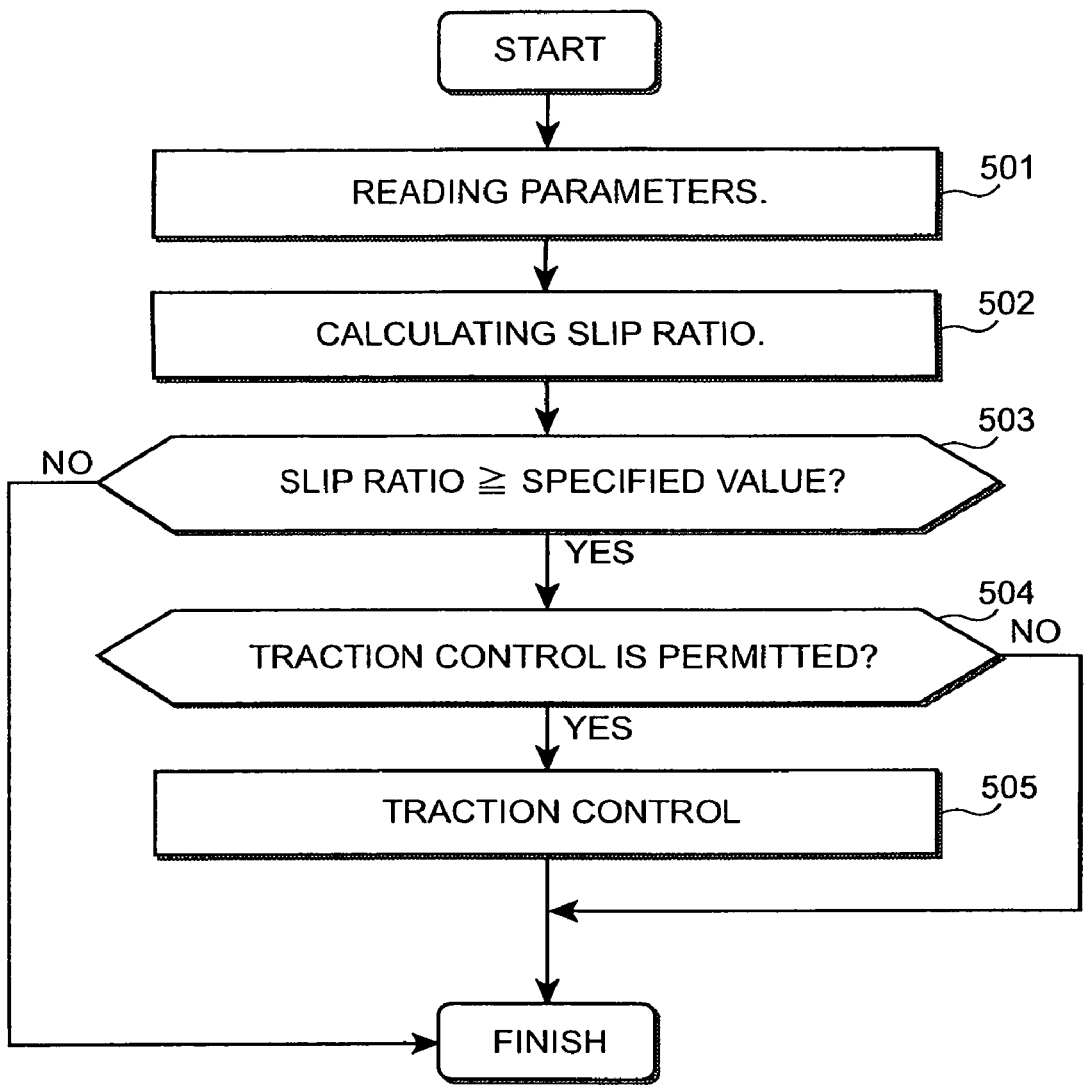
FIG. 5 is a flowchart of the traction control in case of slip under acceleration according to an embodiment of the present invention.

FIG. 5 is a flowchart showing the control details of the traction control in case of slip under acceleration performed by the control apparatus of an automobile according to an embodiment of the present invention.

The following traction control details in case of slip under acceleration are programmed in the computer 100$c$ of the power train control unit 100 and executed repeatedly at a preset interval. In other words, the processing in steps 501 to 505 is executed by the power train control unit 100.

The control unit reads the parameters in step 501, calculates the slip ratio from the left drive wheel speed Vfl, the right drive wheel speed Vfr, the left driven wheel speed Vrl, and the right driven wheel speed Vrr in step 502, and judges whether the slip ratio is greater than a specified value or not in step 503. Processing goes to step 504 if the slip ratio is greater than the specified value, that is, if the drive wheels show tendency to slip, or finishes if the slip ratio is less than the specified value.

The slip ratio Si is calculated as follows: an average driven wheel speed Vr is calculated as (Vrl+Vrr)÷2, using the left driven wheel speed Vrl and right driven wheel speed Vrr; an average drive wheel speed Vf is calculated as (Vfl+Vfr)÷2, using the left drive wheel speed Vfl and right drive wheel speed Vfr; and the slip ratio SI=(Vf−Vr). Vf is calculated, using the average driven wheel speed Vr and average drive gear speed Vf.

A judgment on whether the traction control needs to be performed is made in step 504, and the processing goes to step 505 if the traction control is permitted, or the processing finishes if traction control is not permitted. The judgment processing in step 504 is so designed that, for example, the traction control is permitted upon driver's request for acceleration and under non-shifting control. With this design, unexpected actuation of the traction control that may result in acceleration performance reduction or driving performance reduction can be prevented. In making a judgment in step 504, judgment as to whether the driver is willing to accelerate or not can be made by referring to the accelerator pedal position or variation speed of the accelerator pedal position. For judging a non-shifting control state, a flag for shifting operation may be set and referred to in shifting control (not shown), or it may be checked whether the shift position is at a target position. Detection of the 3rd gear position, for example, can be based on whether the shift position rpSFT in FIG. 3 is within a specified range near SF1.

Figure 6:
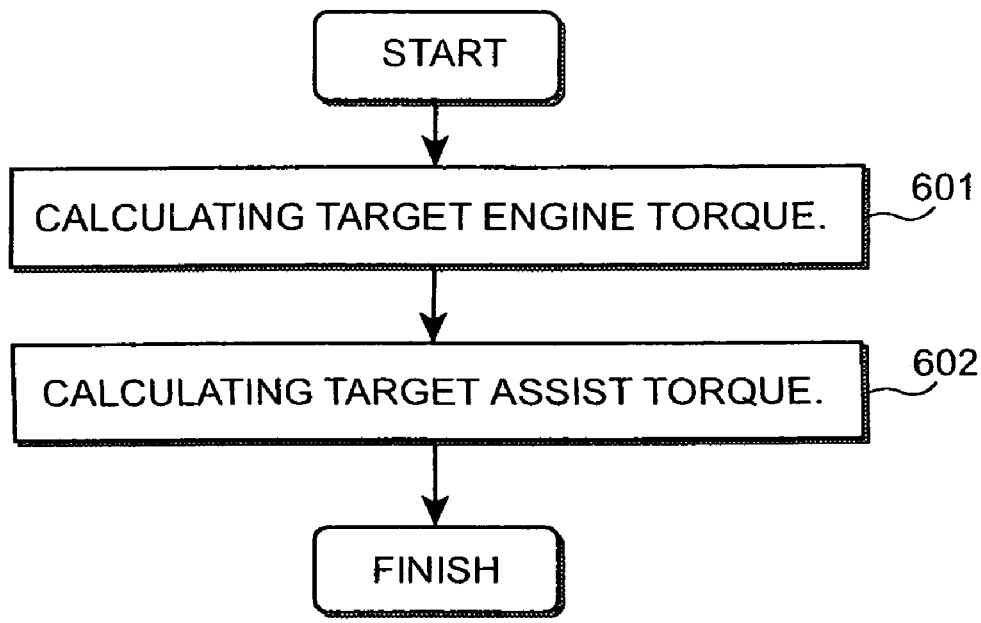
FIG. 6 is an overall flowchart of the traction control in case of slip under acceleration in FIG. 5.

FIG. 6 is a traction control flowchart corresponding to step 505. The traction control flow consists of step 601 (target engine torque calculation) and step 602 (target assist torque calculation). Details of step 601 (target engine torque calculation) are shown in FIG. 7 and details of step 602 (target assist torque calculation) are shown in FIG. 8, FIG. 9 and FIG. 10.

Figure 7:
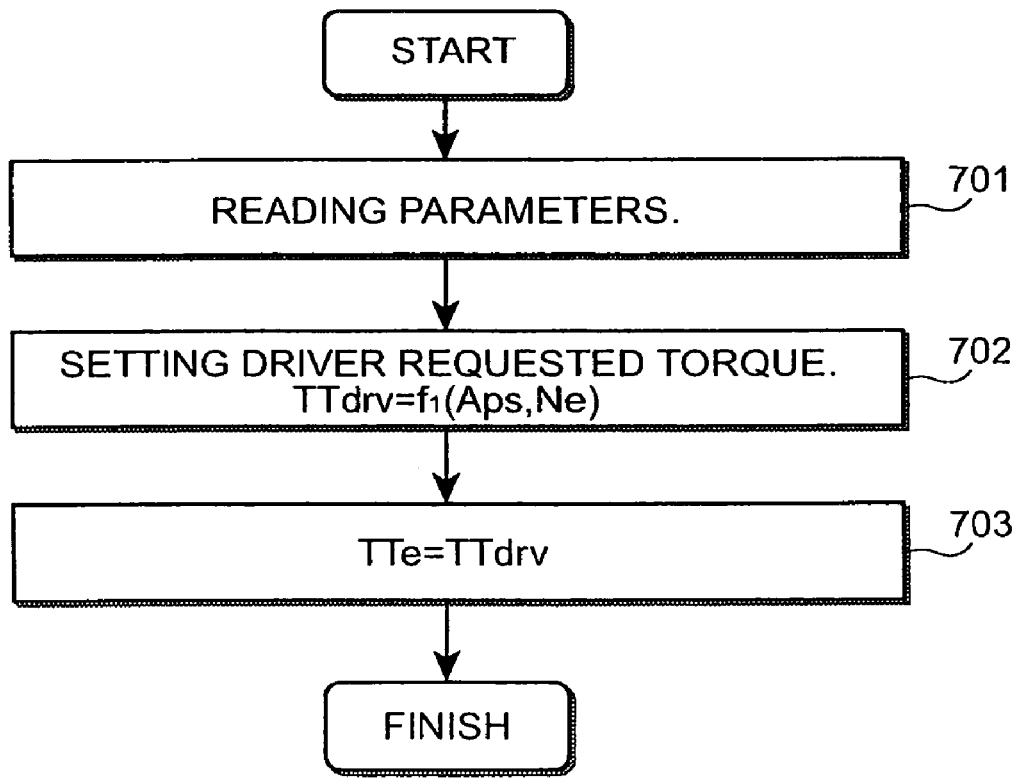
FIG. 7 is a control flowchart of the target engine torque calculation in FIG. 6.

As illustrated in FIG. 7, the control unit reads the parameters in step 701, and calculates the driver requested torque in step 702. The driver requested torque is, for example, set in accordance with the engine speed Ne and the accelerator pedal position Aps from a data map that has been prepared using the engine speed Ne and the accelerator pedal position Aps as inputs. In step 703, the driver requested torque TTdrv is set as the target engine torque TTe.

Figure 8:
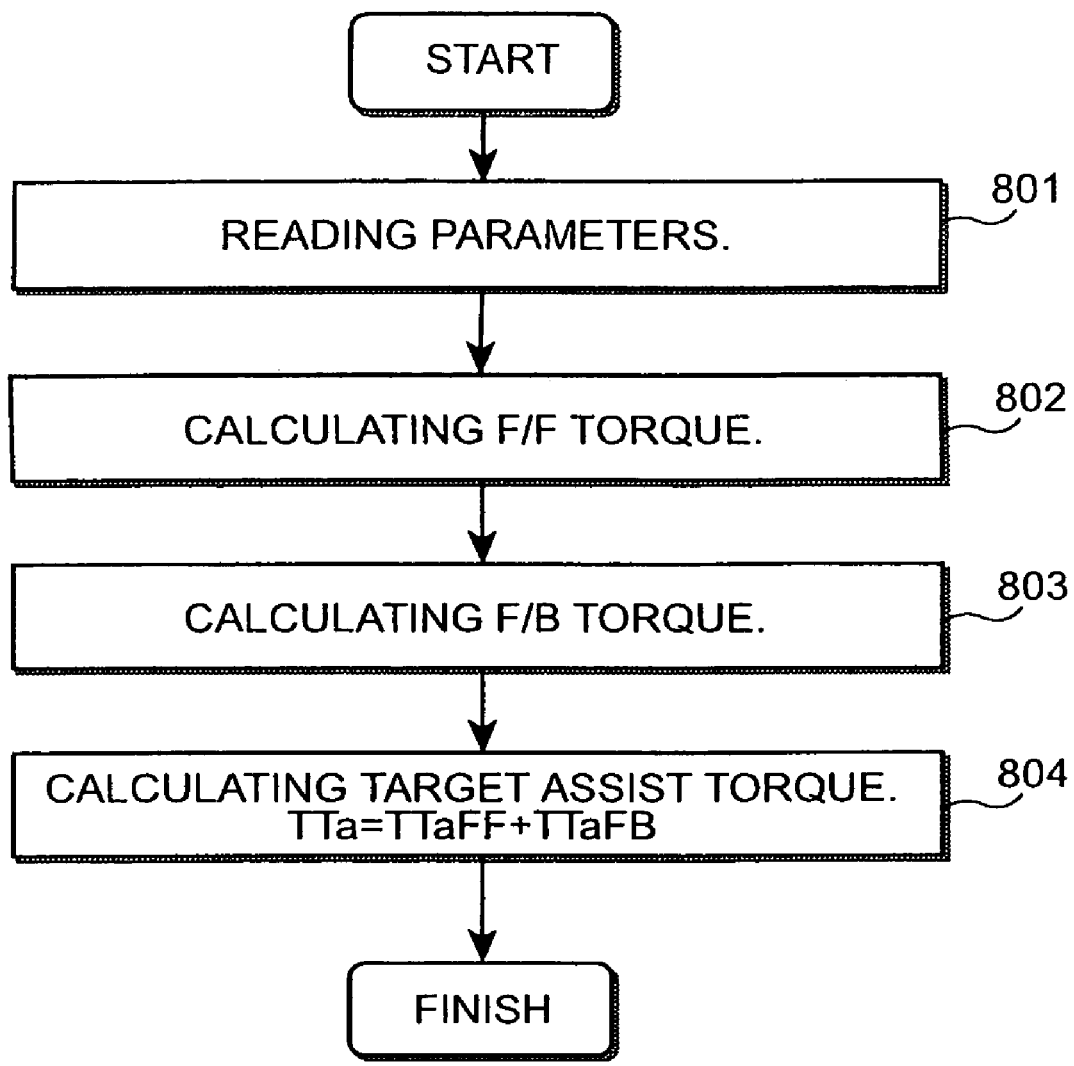
FIG. 8 is a control flowchart of the target assist torque calculation in FIG. 6.
Figure 9:
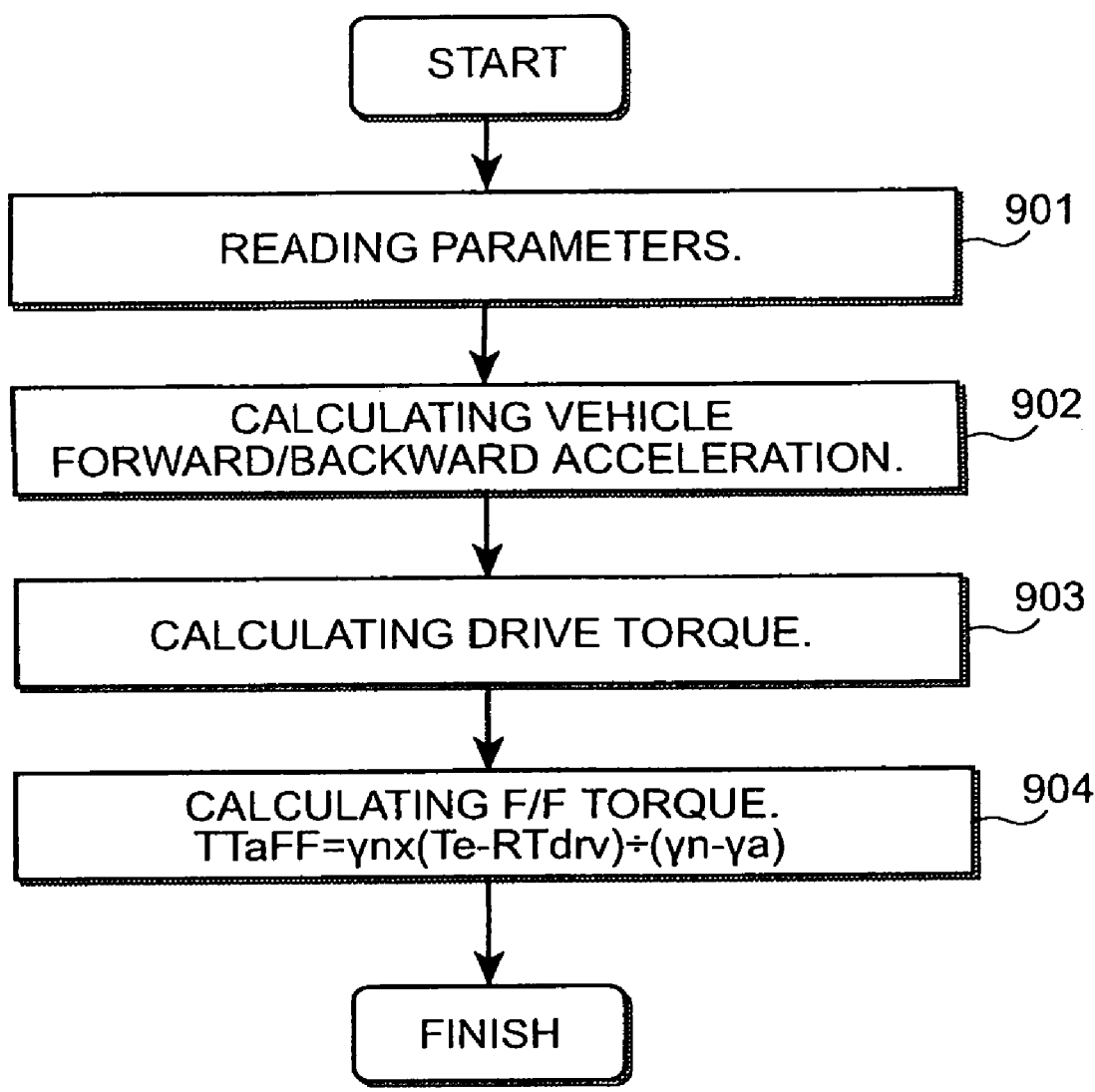
FIG. 9 is a control flowchart of the feed-forward torque calculation in FIG. 8.
Figure 10:
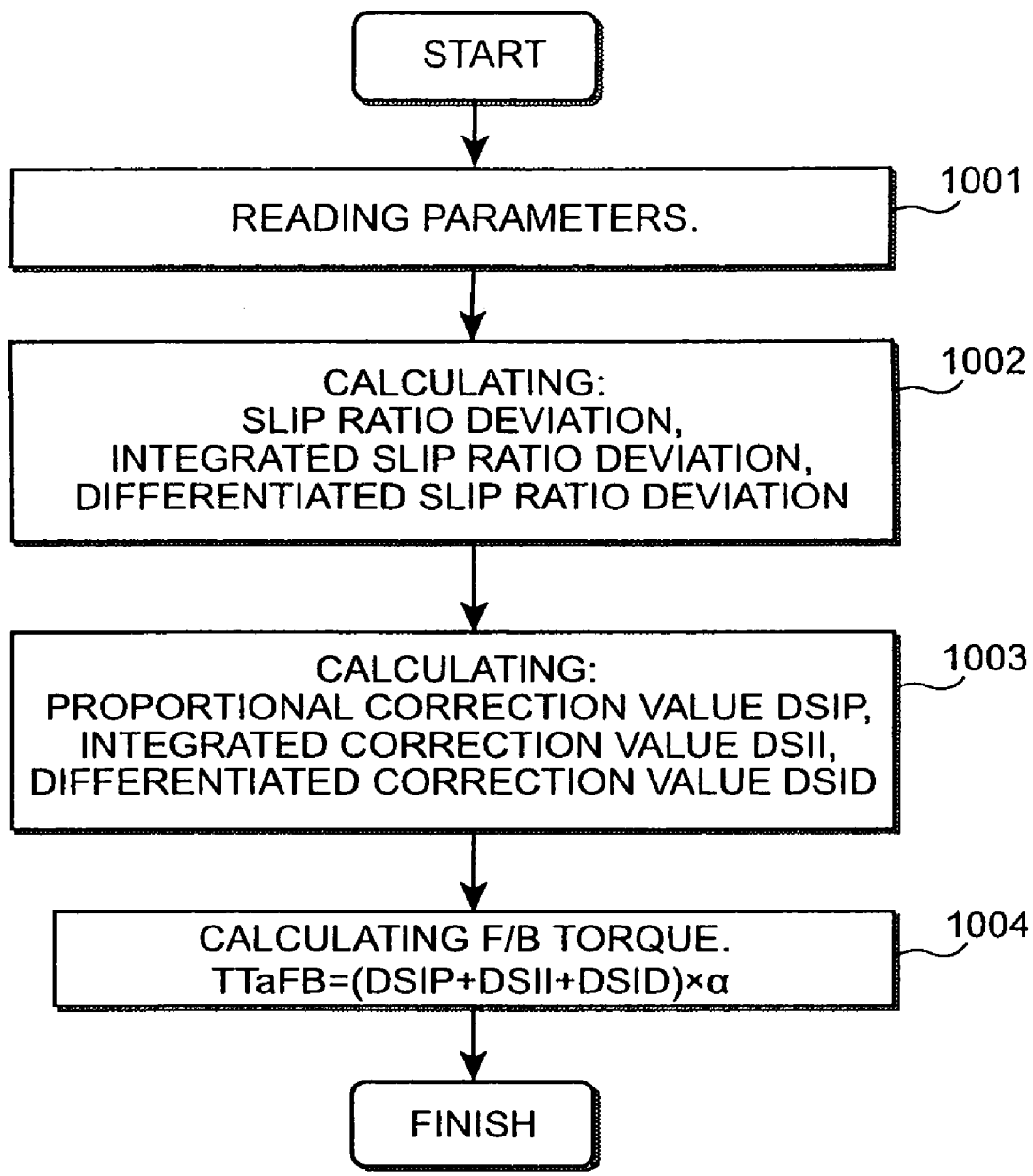
FIG. 10 is a control flowchart of the feedback torque calculation in FIG. 8.

Each of FIG. 8, FIG. 9 and FIG. 10 shows the control flow of step 602 (target assist torque calculation) in FIG. 6.

The control unit reads the parameters in step 801 of FIG. 8 and calculates the feed-forward value of the target assist torque in step 802. Next, it calculates the feedback value of the target assist torque in step 803, and adds the feed-forward value and feedback value to calculate the target assist torque TTa in step 804. Details of step 802 (feed-forward torque calculation) are shown in FIG. 9 and details of step 803 (feedback torque calculation) are shown in FIG. 10.

As illustrated in FIG. 9, the control unit reads the parameters in step 901 and calculates the vehicle forward/backward acceleration Va using the left driven wheel speed Vrl and the right driven wheel speed Vrr in step 902. The control unit differentiates the left driven wheel speed Vrl to calculate the left driven wheel speed variation DVrl per unit time and similarly differentiates the right driven wheel speed Vrr to calculate the right driven wheel speed variation DVrr per unit time. Using past values of the calculated left driven wheel speed variation DVrl and right driven wheel speed variation DVrr, it calculates an average left driven wheel speed variation DVrl_ave, and similarly calculates an average right driven wheel speed variation DVrr_ave. Next, using the average left driven wheel speed variation DVrl_ave and average right driven wheel speed variation DVrr_ave, the control unit calculates the vehicle forward/backward acceleration Va. Given the control period Ts [ms], the vehicle forward/backward acceleration Va [m/s$^2$] is calculated by the equation below:

$$Va=\{(DVrl\_ave+DVrr\_ave)\div2\}\times(10^3\div Ts)\times(1000\div3600)$$

In step 903, the control unit calculates the drive torque RTdrv necessary for realizing the vehicle forward/backward acceleration Va. Given the vehicle weight Vm [kg], tire effective radius Tr [m], final gear ratio γf, present gear ratio γn, and transmission efficiency η, the drive torque RTdrv [Nm] is calculated by the equation below:

$$RTdrv=(Va\times Vm\times Tr)\div(\gamma f\times\gamma n\times\eta)$$

In step 904, the control unit specifies the target assist torque feed-forward value TTaFF in accordance with the difference (Te−RTdrv) between the estimated engine torque Te and drive torque RTdrv. Given the present gear ratio gn and gear ratio ga of the assist clutch engaging position, the assist torque needed to decrease the transmission output shaft torque to the drive torque RTdrv is expressed as:

$$gn\times(Te-RTdrv)\div(gn-ga)$$

Basically, the embodiment is designed so that the target assist torque feed-forward value TTaFF becomes asymptotic to gn×(Te−RTdrv)÷(gn−ga) in a specified length of time, but it is also permissible to include an adjustment gain or to define the time for becoming asymptotic as a function of slip ratio.

FIG. 10 shows the control flow of step 803 (feedback torque calculation) in FIG. 8.

The control unit reads the parameters in step S1001 and calculates the deviation between the target slip ratio TSI and slip ratio SI, the integrated deviation, and the differentiated deviation in step 1002. The target slip ratio is generally set to a value within a range (near 0.2, for example) in which wheels can transfer the drive force to the ground favorably. Next, the control unit calculates the proportional correction value DSIP, the integrated correction value DSII, and the differentiated correction value DSID in step 1003, and calculates the target assist torque feedback value TTaFB in step 1004. Given the unit conversion coefficient a, the target assist torque feedback value TTaFB is calculated as TTaFB=(DSIP+DSII+DSID)×a.

Figure 11:
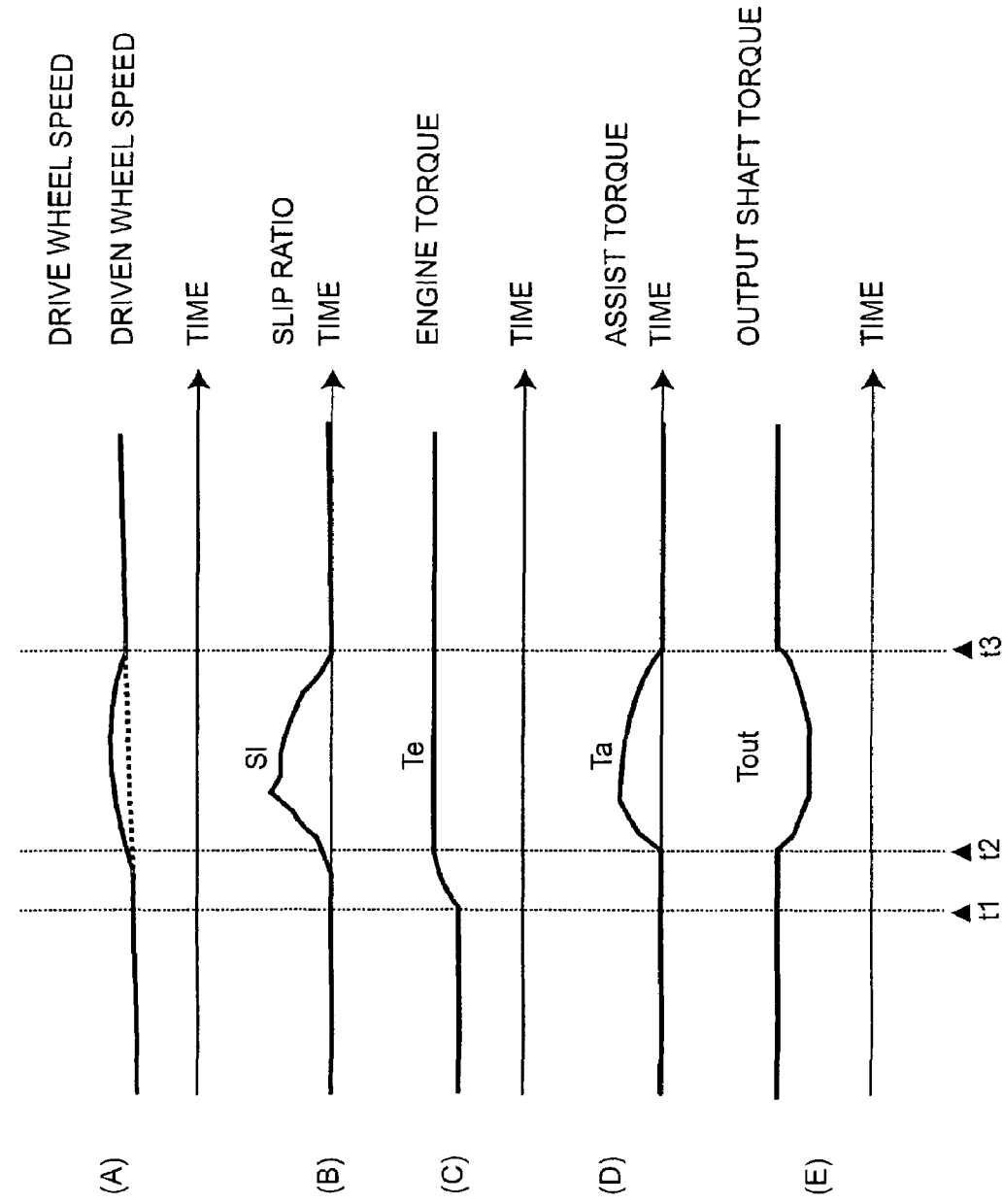
FIG. 11 is a timing chart of the traction control in case of slip under acceleration based on the constructions shown in FIG. 5 to FIG. 10.

FIG. 11 shows the timing chart of the traction control in case of slip under acceleration based on the constructions shown in FIG. 5 to FIG. 10.

In FIG. 11, the traction control in case of slip under acceleration is in process during the period from time t2 to time t3. A bold line in (A) represents the drive wheel speed, and a dotted line represents the driven wheel speed. The drive wheel speed is nearly equal to the driven wheel speed before the middle between t1 and t2 and after t3, and hence the two lines are superposed in the figure. (B) represents the slip ratio. (C) represents the engine torque. (D) represents the assist clutch torque. (E) represents the transmission output torque.

In the traction control in the presence of slip under acceleration, since the driver steps down the accelerator pedal at time t1 and hence the driver requested torque increases, the engine torque increases. That is, although the drive power source is controlled to generate torque in accordance with the driver requested torque, the traction control is begun because the drive wheels exhibit a tendency to slip and the slip ratio exceeds a specified value at time t2. By actuating the assist clutch torque (D) and decreasing the transmission output torque (E), the drive torque transferred to the drive wheel is consequently decreased, and at time t3, when the slip ratio becomes lower than a specified value, the traction control finishes.

Figure 12:
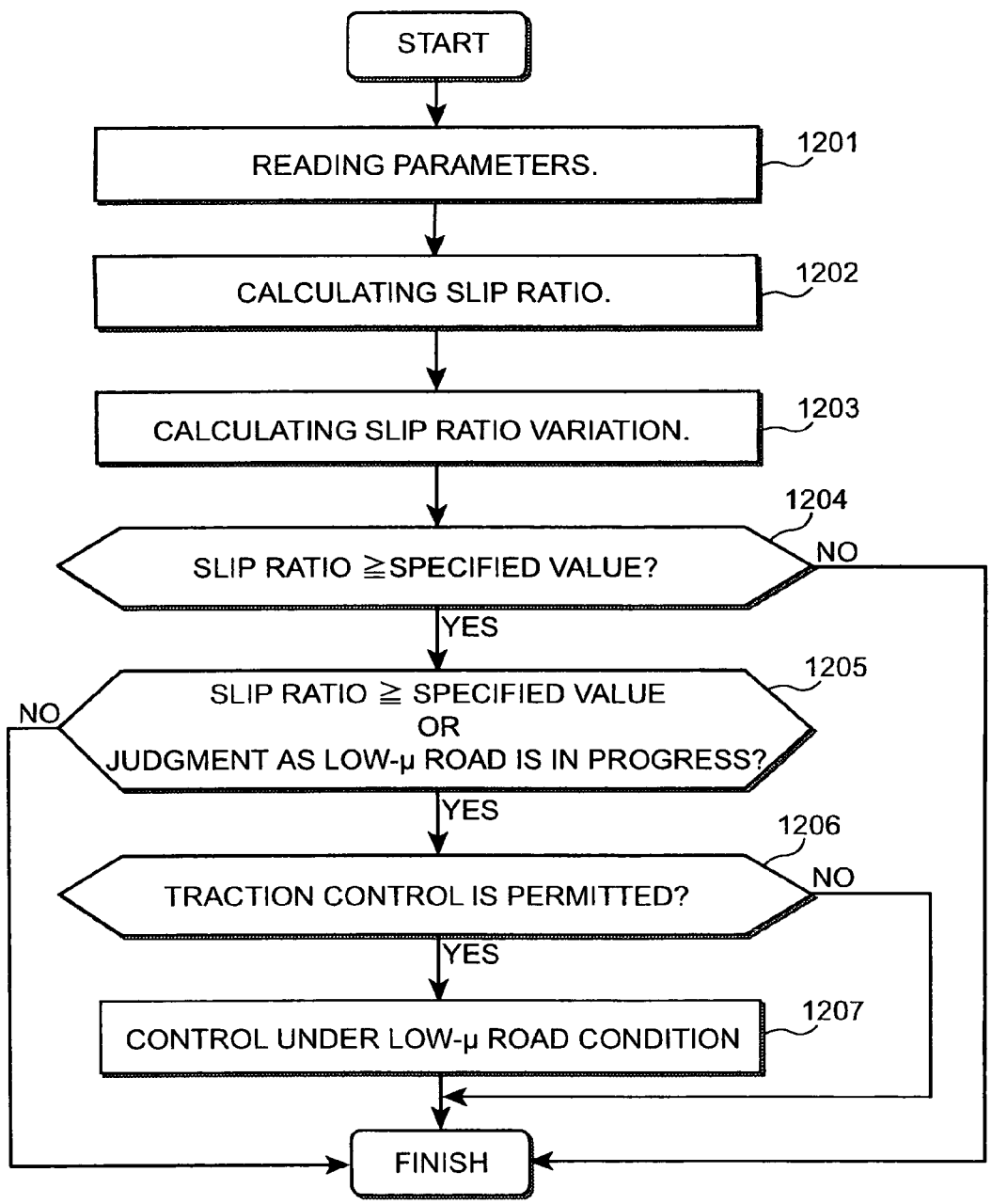
FIG. 12 is a flowchart of the traction control in case of slip upon start according to an embodiment of the present invention.
Figure 13:
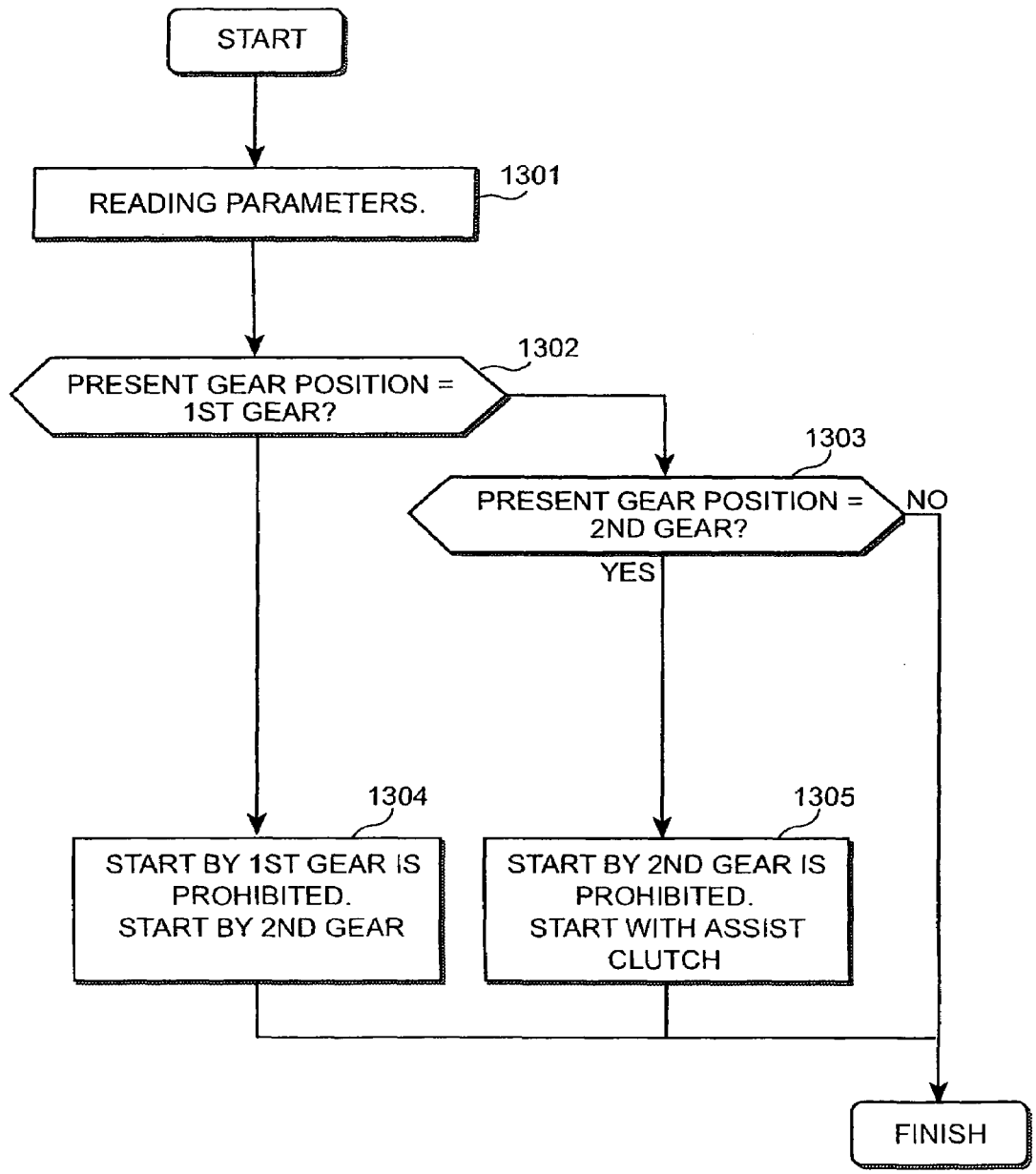
FIG. 13 is a flowchart of the traction control in FIG. 12.

Next, the traction control upon start according to an embodiment of the present invention is described by using FIG. 12 and FIG. 13.

FIG. 12 is a flowchart of the traction control in case of slip upon start according to an embodiment of the present invention.

The following traction control details upon start are programmed in the computer 100c of the power train control unit 100 and executed repeatedly at a preset interval. In other words, the processing in steps 1201 to 1207 is executed by the power train control unit 100.

The control unit reads the parameters in step 1201, calculates the slip ratio from the left drive wheel speed Vfl, the right drive wheel speed Vfr, the left driven wheel speed Vrl, and the right driven wheel speed Vrr in step 1202, and calculates the slip ratio variation in step 1203. The slip ratio SI is calculated as follows: an average driven wheel speed Vr is calculated as (Vrl+Vrr)÷2, using the left driven wheel speed Vrl and the right driven wheel speed Vrr; an average drive wheel speed Vf is calculated as (Vfl+Vfr)÷2, using the left drive wheel speed Vfl and the right drive wheel speed Vfr; and the slip ratio SI=(Vf−Vr)÷Vf is calculated, using the average driven wheel speed Vr and average drive gear speed Vf. In addition, the slip ratio SI is differentiated to calculate the slip ratio variation DSI per unit time.

The control unit judges whether the slip ratio is greater than a specified value or not in step 1204, and the processing goes to step 1205 if the slip ratio is greater than the specified value, that is, if the drive wheels show a tendency to slip. The processing finishes if the slip ratio is less than the specified value.

In step 1205, if the slip ratio variation DSI at the time when the slip ratio Si has exceeded the specified value is greater than a predetermined slip ratio variation threshold, the control unit judges the road to be a road with low μ value and the processing goes to step 1206. If the slip ratio SI continues to be in excess of the specified value after a judgment is made that the road is a road with low μ value, the control unit regards the judgment to be in progress, and the processing goes to step 1206. If neither condition above applies, the processing finishes.

The control unit judges whether the traction control needs to be performed in step 1206 and the processing goes to step 1207 if the traction control is permitted. The processing finishes if traction control is not permitted. The judgment processing in step 1206 is designed so that, for example, the traction control is permitted upon a driver's will to start (request for acceleration) and under a non-shifting control. With this design, unexpected actuation of the traction control that may result in acceleration performance reduction or driving performance reduction can be prevented. Judgment as to whether the driver is willing to start or not can be made by referring to the vehicle speed, the range position signal, and the accelerator pedal position, or by the speed variation of the accelerator pedal position. For judging a non-shifting control state, a flag for shifting operation may be set and referred to in shifting control (not shown), or it may be checked whether the shift position is at a target position. Judgment that the shift position is the 3rd gear position, for example, can be based on whether the shift position rpSFT in FIG. 3 is within a specified range near SF1.

FIG. 13 shows a flowchart of the traction control corresponding to step 1207.

The control unit reads the parameters in step 1301, judges whether the present gear position is the 1st gear or not in step 1302, and the processing goes to step 1304 if the present gear position is the 1st gear, that is, if slip is caused upon start by the 1st gear, or to step 1303 if the present gear position is other than the 1st gear.

In step 1304, the control unit prohibits start by the 1st gear, and also engages the 2nd gear and performs a start control under a 2nd gear condition.

The control unit judges whether the present gear position is the 2nd gear or not in step 1303, and the processing goes to step 1305 if the present gear position is the 2nd gear, that is, if slip is caused upon a start by the 2nd gear. Processing finishes if the present gear position is other than the 2nd gear.

In step 1305, the control unit prohibits a start by the 2nd gear, and also engages the assist clutch and then performs a start control.

Since this embodiment is designed to make a start with the 1st gear or with the 2nd gear in the start control without slip, the control is performed according to the flowchart in FIG. 13.

With the construction described, decreased power performance in case of slip under acceleration can be minimized by the use of the assist clutch, and decreased start performance can be minimized.

In addition, the drive torque in case of wheel slip can be reduced with high response, and wheel slip can be avoided.

In one embodiment of the present invention, a transmission is equipped with a drive power source, gear type transmission comprising multiple torque transfer mechanisms and multiple gear pairs capable of transferring torque from the input shaft to the output shaft, and a wheel slip sensor. Multiple torque transfer paths from the input shaft to the output shaft can be formed using the multiple torque transfer mechanisms and the multiple gear pairs. The transmission employs a transfer torque variable system for at least one of the torque transfer mechanisms, as well as a mesh type mechanism for at least one of the mechanisms. If a wheel slip condition is sensed by the wheel slip sensor while the automobile is driving using the first torque transfer path, which is any one of the multiple torque transfer paths formed by the torque transfer mechanisms and gear pairs, the second torque transfer path is formed through which, with the aid of the transfer torque variable system, at least part of the torque of the drive power source is transferred to the output shaft by controlling the transfer torque variable system while maintaining the first torque transfer path.

In forming the second torque transfer path for transferring at least part of the torque of the drive power source to the output shaft by the transfer torque variable system, it is preferable not to adjust the torque of the drive power source.

In forming the second torque transfer path for transferring at least part of the torque of the drive power source to the output shaft by the transfer torque variable system, it is also preferable to have the torque of the drive power source equivalent to the driver requested torque.

In another embodiment of the present invention, a transmission is again equipped with a drive power source, gear type transmission comprising multiple torque transfer mechanisms and multiple gear pairs capable of transferring torque from the input shaft to the output shaft, and a wheel slip sensor. Multiple torque transfer paths from the input shaft to the output shaft can be formed using the multiple torque transfer mechanisms and the multiple gear pairs. The transmission employs a transfer torque variable system for at least one of the torque transfer mechanisms, as well as a mesh type mechanism for at least one of the mechanisms. If a wheel slip condition is sensed by the wheel slip sensor while the automobile is starting using the first torque transfer path, which is any one of the multiple torque transfer paths formed by the torque transfer mechanisms and gear pairs, and the slip variation exceeds the first specified value, forming a torque transfer path at the gear position to form the first torque transfer path is prohibited at the time of the next start until the variation drops below the second specified value. The second torque transfer path is also formed through which, and with the aid of the transfer torque variable system, at least part of the torque of the drive power source is transferred to the output shaft by controlling the transfer torque variable system while maintaining the first torque transfer path.

It is preferable that the slip variation is equal to the slip variation at the time the slip exceeds the specified value.

What is claimed is:

1. A control apparatus for an automobile, which controls a gear type transmission comprising a first torque transfer path between input and output shafts, which is formed by a mesh type transfer device and a second torque transfer path between the input and output shafts, which is formed by a transfer torque variable system, wherein when wheel slip is sensed while the automobile is driving using the first torque transfer path, traction control is performed by forming the second torque transfer path by controlling the transfer torque variable system with the first torque transfer path, and reducing an output shaft drive torque of said transmission by transferring at least part of the torque being transferred via the first torque transfer path through the second torque transfer path.

2. The control apparatus of for an automobile according to claim 1, wherein the control apparatus also controls the drive power source for supplying torque to the input shaft of the gear type transmission and further controls the power source, while part of the torque being transferred via the first torque transfer path is transferred via the second torque transfer path, so as to generate torque in accordance with operation of an accelerator by a driver.

3. The control apparatus for an automobile according to claim 1, wherein the traction control is performed upon request by a driver for acceleration and under non-shifting control.

4. The control apparatus for an automobile according to claim 1, wherein when a wheel slip ratio greater than a specified value is sensed and a slip ratio variation greater than a specified value continues at a start of the automobile, the gear type transmission is controlled so as to prohibit the 1st gear from engaging and to engage the 2nd gear.

5. The control apparatus for an automobile according to claim 4, wherein when a wheel slip ratio greater than a specified value is still sensed and a slip ratio variation greater than a specified value continues even after the above start with the 2nd gear is selected, the gear type transmission is controlled so as to prohibit the 2nd gear from engaging and to make a start by controlling the transfer torque variable system.

6. A power train system for an automobile equipped with a gear type transmission comprising a first torque transfer path between input and output shafts, which is formed by a mesh type transfer device and a second torque transfer path between the input and output shafts, which is formed by a transfer torque variable system, and an actuator for selecting the above torque transfer path, wherein when wheel slip occurs while the automobile is driving using the first torque transfer path, at least part of the torque being transferred via the first torque transfer path is transferred via the second torque transfer path by incorporating the second torque transfer path with the first torque transfer path.

7. The power train system for an automobile according to claim 6, wherein the actuator is controlled upon request by a driver for acceleration and under non-shifting control.

8. The power train system for an automobile according to claim 6, wherein when a wheel slip ratio greater than a specified value is sensed and a slip ratio variation greater than a specified value continues at a start of the automobile, the actuator is controlled so as to prohibit the 1st gear from engaging and to engage the 2nd gear.

9. The power train system of for an automobile according to claim 8, wherein when a wheel slip ratio greater than a specified value is still sensed and a slip ratio variation greater than a specified value continues even after the above start with the 2nd gear is selected, the actuator is controlled so as to prohibit the 2nd gear from engaging and to make a start by controlling the transfer torque variable system.

* * * * *

UNITED STATES PATENT AND TRADEMARK OFFICE
CERTIFICATE OF CORRECTION

PATENT NO. : 7,575,084 B2
APPLICATION NO. : 10/996060
DATED : August 18, 2009
INVENTOR(S) : Fujimoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1101 days.

Signed and Sealed this

Seventh Day of September, 2010

David J. Kappos
*Director of the United States Patent and Trademark Office*